US012236010B2

United States Patent
Li et al.

(10) Patent No.: US 12,236,010 B2
(45) Date of Patent: Feb. 25, 2025

(54) WEARABLE DISPLAY DEVICE (71) Applicant: BOE Technology Group Co., Ltd., Beijing (CN)

(72) Inventors: Yapeng Li, Beijing (CN); Xuan Feng, Beijing (CN); Lei Wang, Beijing (CN); Ping Zhang, Beijing (CN); Wenhao Tian, Beijing (CN); Yunke Qin, Beijing (CN); Yangbing Li, Beijing (CN); Chengfu Xu, Beijing (CN)

(73) Assignee: BOE Technologies Group Co., Ltd., Beijing (CN)

( * ) Notice: Subject to any disclaimer, the term of this patent is extended or adjusted under 35 U.S.C. 154(b) by 0 days.

(21) Appl. No.: 17/776,482

(22) PCT Filed: May 27, 2021

(86) PCT No.: PCT/CN2021/096410
§ 371 (c)(1),
(2) Date: May 12, 2022

(87) PCT Pub. No.: WO2022/246741
PCT Pub. Date: Dec. 1, 2022

(65) Prior Publication Data
US 2024/0160281 A1  May 16, 2024

(51) Int. Cl.
*G06F 3/01* (2006.01)

(52) U.S. Cl.
CPC .................... *G06F 3/013* (2013.01)

(58) Field of Classification Search
CPC .......... G06F 3/013; G06F 3/01; G06F 3/0304; G02B 27/0093; G02B 27/017; G02B 27/0179; G02B 2027/014; G02B 2027/0187; H04N 5/33
See application file for complete search history.

(56) References Cited

U.S. PATENT DOCUMENTS

| | | | |
|---|---|---|---|
| 2018/0032103 A1* | 2/2018 | Eskilsson | G06F 1/166 |
| 2019/0250707 A1* | 8/2019 | Kondo | G02B 27/0093 |
| 2020/0110271 A1 | 4/2020 | Komogortsev et al. | |
| 2021/0239883 A1* | 8/2021 | Georgiou | G02B 3/0056 |

FOREIGN PATENT DOCUMENTS

| | | |
|---|---|---|
| CN | 107223276 A | 9/2017 |
| CN | 109256042 A | 1/2019 |
| CN | 111766702 A | 10/2020 |

\* cited by examiner

*Primary Examiner* — Abhishek Sarma
(74) *Attorney, Agent, or Firm* — IPro, PLLC (57) ABSTRACT

Provided is a wearable display device. The wearable display device includes a display panel, comprising a display region and a peripheral region surrounding the display region; a plurality of light-emitting elements, configured to emit light to be irradiated to eyes of a user; a lens assembly, disposed on a light-exiting side of the display panel, the lens assembly comprising a lens mount and a lens within the lens mount, a light transmittance of the lens mount being greater than a threshold; and a plurality of photoelectric sensor assemblies in the peripheral region.

15 Claims, 8 Drawing Sheets

WEARABLE DISPLAY DEVICE

CROSS-REFERENCE TO RELATED APPLICATION

The present disclosure is a US national stage of international application No. PCT/CN2021/096410, filed on May 27, 2021, the content of which is incorporated herein by reference in its entirety.

TECHNICAL FIELD

The present disclosure relates to the field of virtual reality technologies, and in particular, relates to a wearable display device.

BACKGROUND

A virtual reality (VR) device refers to a device that can create a virtual environment based on displayed images and exerts an immersive feeling for the user in the virtual environment.

SUMMARY

The present disclosure provides a wearable display device. The technical solutions are as follows:

In one aspect, a wearable display device is provided. The wearable display device includes:

a display panel, including a display region and a peripheral region surrounding the display region;

a plurality of light-emitting elements, configured to emit light to be irradiated to eyes of a user;

a lens assembly, disposed on a light-exiting side of the display panel, wherein the lens assembly includes a lens mount and a lens disposed within the lens mount, the lens mount having a light transmittance greater than a threshold; and a plurality of photoelectric sensor assemblies, disposed in the peripheral region, each of the photoelectric sensor assemblies being configured to receive an optical signal, reflected via the eyes of the user, of the light-emitting element transmitted via a target structure and convert the optical signal into an electric signal for determining a gaze position of the eyes of the user on the display panel, the target structure being the lens or the lens mount.

Optionally, the plurality of light-emitting elements are infrared light-emitting diodes.

Optionally, the target structure is the lens mount; and a target region of the lens mount is configured to transmit infrared light and absorb visible light, and the target region includes a zone configured to transmit the optical signal of the light-emitting element reflected via the eyes of the user.

Optionally, the wearable display device further includes: an optical structure;

wherein the optical structure is disposed between the photoelectric sensor assemblies and the lens assembly, and an orthographic projection of the optical structure on the display panel is within in the peripheral region; the optical structure includes a light shielding region and a plurality of light transmissive regions, each of the light transmissive regions being configured to transmit the optical signal to at least one of the photoelectric sensor assemblies.

Optionally, the lens is in a circular shape; the distance l between the center of each of the light transmissive regions and a center of the display region of the display panel satisfies:

$$l \geq \frac{(d1+d2)(R1+a)}{d1} - a;$$

wherein d1 represents a distance between the user eyes and the lens, d2 represents a distance between the lens and the display panel, R1 represents a radius of the lens, and a represents a maximum radius of movement of the pupils.

The plurality of light-emitting elements are arranged evenly, and each of the light-emitting elements is fixedly connected to one side, distal from the display panel, of the lens mount; and a distance R2 between one side, proximal to the lens, of each of the plurality of light-emitting elements and a center of the lens satisfies:

$$R2 \geq \frac{(l-a)d1}{d1+d2} + a.$$

The target region of the lens mount is disposed between the light-emitting element and the lens; or the target region of the lens mount is the entire region of the lens mount.

Optionally, a material of the target region of the lens mount includes at least one of acrylonitrile butadiene styrene copolymers, polycarbonate, and polymethyl methacrylate.

Optionally, the target structure is the lens; and the lens is configured to transmit infrared light and visible light.

Optionally, the wearable display device further includes: an optical structure;

wherein the optical structure is disposed between the photoelectric sensor assemblies and the lens assembly, and an orthographic projection of the optical structure on the display panel is within the peripheral region; and the optical structure includes a light shielding region and a plurality of light transmissive regions, each of the light transmissive regions being configured to transmit the optical signals to at least one of the photoelectric sensor assemblies. Optionally, the lens is in a circular shape; a radius R2 of the lens satisfies:

$$R2 \geq \frac{(l-a)d1}{d1+d2} + a;$$

wherein l represents a distance between a center of the light transmissive region and the center of the display region of the display panel, d1 represents a distance between the eyes of the user and the lens along a direction perpendicular to the display panel, d2 represents a distance between the lens and the display panel along the direction perpendicular to the display panel, and a represents a maximum radius of movement of the pupils.

Optionally, the wearable display device includes: a filter;

wherein the filter is disposed on a side, distal from the display panel, of the plurality of photoelectric sensor assemblies, and an orthographic projection of the filter on the display panel covers an orthographic projection of the plurality of photoelectric sensor assemblies on the display panel; the filter is configured to transmit infrared light and absorb visible light.

Optionally, the wearable display device further includes: a light transmitting layer;

wherein the light transmitting layer is disposed on a side, distal from the display panel, of the plurality of photoelectric sensor assemblies.

Optionally, the peripheral region includes a first region extending along a first direction and a second region extending along a second direction, the first direction being intersected with the second direction; and the plurality of photoelectric sensor assemblies include a plurality of first photoelectric sensor assemblies and a plurality of second photoelectric sensor assemblies, the plurality of first photoelectric sensor assemblies being arranged along the first direction in the first region, and the plurality of second photoelectric sensor assemblies being arranged along the second direction in the second region.

Optionally, the wearable display device further includes: a processing circuit;

wherein the processing circuit is connected to each of the photoelectric sensor assemblies, and the processing circuit is configured to determine the gaze position of the eyes of the user on the display panel based on signal values of electric signals transmitted via each of the photoelectric sensor assemblies and a position of at least one of the photoelectric sensor assemblies.

BRIEF DESCRIPTION OF DRAWINGS

To illustrate the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

In the related art, a VR device includes a display panel, a camera, a processor, and a drive circuit. The camera is used to capture an eye image of the user. The processor determines a gaze position of the user on the display panel according to the eye image, and partially renders a to-be-displayed image according to the gaze position. The drive circuit drives, based on a received partially rendered display image, the display panel to display data. Because the processor may only partially render the region of the gaze position in the display image and does not need to globally render the to-be-displayed image, not only a load of the processor may be reduced, but also a display effect of the display panel may be ensured.

However, in the related art, the processor has a low efficiency in determining the gaze position according to the eye image captured by the camera, thereby resulting in a low display efficiency of the display panel.

The terms used in the detailed description of the present disclosure are merely for interpreting, instead of limiting, the embodiments of the present disclosure. It should be noted that unless otherwise defined, technical or scientific terms used in the embodiments of the present disclosure shall have ordinary meanings understandable by persons of ordinary skill in the art. The terms "first," "second," and the like used in the embodiments of the present disclosure are not intended to indicate any order, quantity or importance, but are merely used to distinguish the different components. The terms "comprise," "include," and derivatives or variations thereof are used to indicate that the element or object preceding the terms covers the element or object following the terms and its equivalents, and shall not be understood as excluding other elements or objects. The terms "connect," "contact," and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly.

Figure 1:
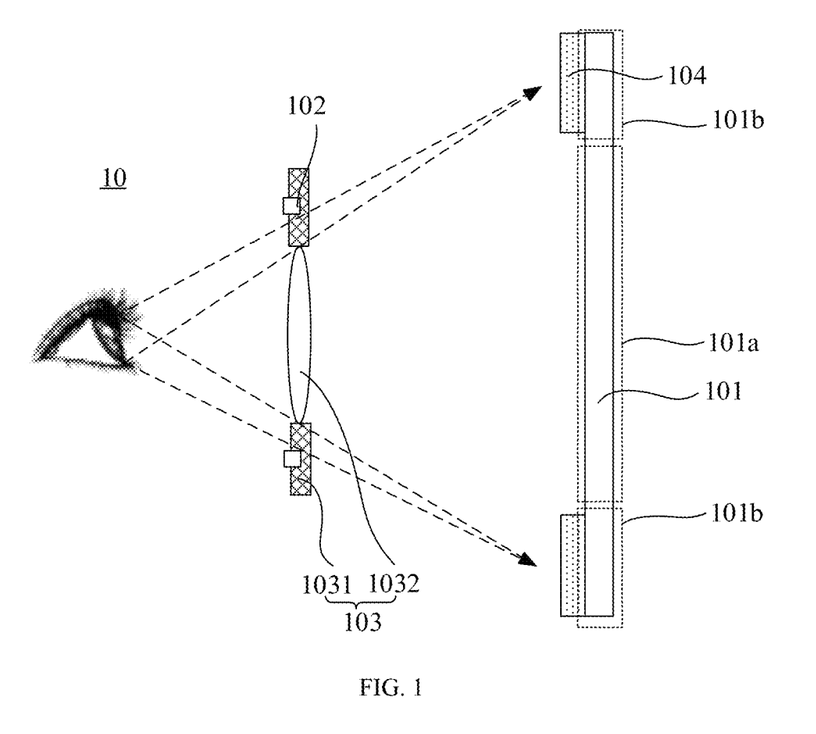
FIG. 1 is a schematic structural view of a wearable display device according to an embodiment of the present disclosure.

FIG. 1 is a schematic structural view of a wearable display device according to an embodiment of the present disclosure. As shown in FIG. 1, the wearable display device 10 may include a display panel 101, a plurality of light-emitting elements 102, a lens assembly 103, and a plurality of photoelectric sensor assemblies 104. FIG. 1 shows two light-emitting elements 102 and two photoelectric sensor assemblies 104.

As shown in FIG. 1, the lens assembly 103 may be disposed at a light-exiting side of the display panel 101. The lens assembly 103 includes a lens mount 1031 and a lens 1032 disposed within the lens mount 1031. The user can view the image displayed by the display panel 101 via the lens 1032, and the lens mount 1031 is configured to support and fix the lens 1032. The lens mount 1031 may be an annular structure, and the lens mount 1031 may be disposed within a region enclosed by the annular structure of the lens mount 1031.

In the embodiment of the present disclosure, the light emitted by the light-emitting element 102 is configured to be irradiated eyes of a user, and the eyes of the user can reflect the light emitted by the light-emitting element 102. Each of the photoelectric sensor assemblies 104 is configured to receive an optical signal, reflected via the eyes of the user, of the light-emitting element 102 transmitted via a target structure, and convert the optical signal into an electric signal. The electric signal is configured to determine the gaze position of the eyes of the user on the display panel 101. The target structure is a lens 1032 or a lens mount 1031.

Because the light transmittance of the lens mount 1031 is greater than a threshold (a value that can transmit light), and the lens 1032 is generally made of a transparent material (a material capable of transmitting light), the optical signal, reflected via the eyes of the user, of the light-emitting element 102 may be transmitted via the lens mount 1031 or may be transmitted via the lens 1032. However, each of the photoelectric sensor assemblies 104 is capable of receiving only the optical signal, reflected via the eyes of the user, of the light-emitting element 102 transmitted via the target structure.

That each of the photoelectric sensor assemblies 104 is configured to receive the optical signal, reflected via the eyes of the user, of the light-emitting elements 102 transmitted via the target structure may mean that: each of the photoelectric sensor assemblies 104 is only configured to receive the optical signal, reflected via the eyes of the user, of the light-emitting element 102 transmitted via the target structure, instead of receiving the optical signal, reflected via the eyes of the user, of the light-emitting elements 102 transmitted via another structure other than the target structure in the lens assembly 103.

That is, a light-sensing region of each of the photoelectric sensor assemblies 104 may be overlapped with a light path of the optical signal, reflected via the eyes of the user, of the light-emitting element 102 transmitted via the target structure, and may be not overlapped with a light path of the optical signal, reflected via the eyes of the user, of the light-emitting element 102 transmitted via the another structure other than the target structure.

In one possible scenario, as shown in FIG. 1, the target structure is a lens mount 1031. In the optical signals of the light-emitting element 102 reflected via the eyes of the user, the optical signal transmitted via the lens mount 1031 is received by the photoelectric sensor assembly 104. In the optical signals of the light-emitting element 102 reflected via the eyes of the user, the optical signal transmitted via the lens 1032 is not received by the photoelectric sensor assembly 104.

Figure 2:
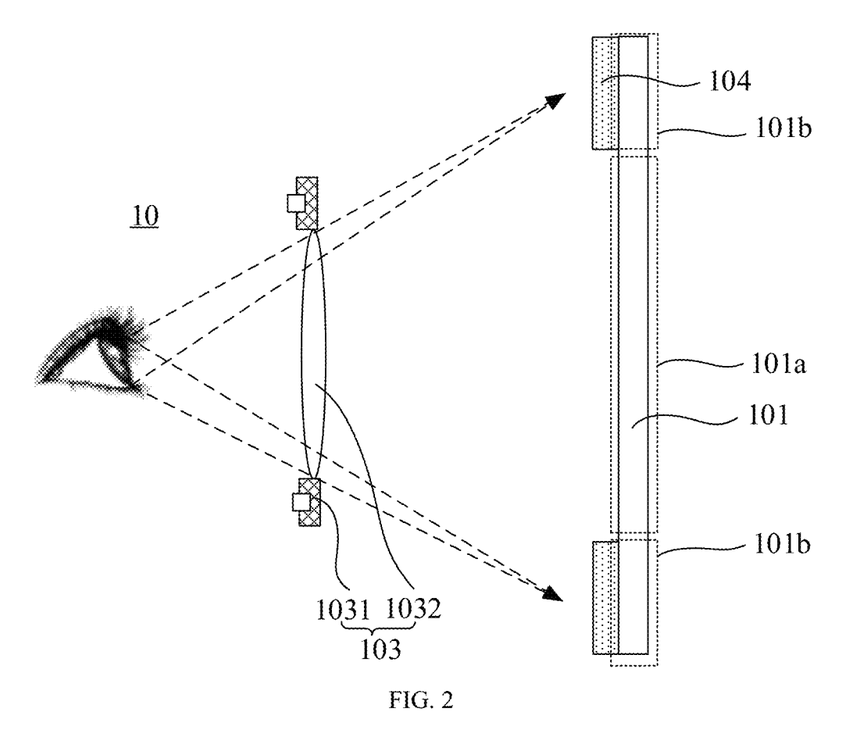
FIG. 2 is a schematic structural view of another wearable display device according to an embodiment of the present disclosure.

In another possible scenario, as shown in FIG. 2, the target structure is a lens 1032. In the optical signals of the light-emitting element 102 reflected via the eyes of the user, the optical signal transmitted via the lens 1032 is received by the photoelectric sensor assembly 104. In the optical signals of the light-emitting elements 102 reflected via the eyes of the user, the optical signal transmitted via the lens mount 1031 is not received by the photoelectric sensor assemblies 104.

In the embodiments of the present disclosure, because the photoelectric sensor assemblies 104 receive, via one element of the lens assembly 103, the optical signals reflected via the eyes of the user (the target structure), the optical signals received by the photoelectric sensor assemblies 104 are prevented from being transmitted via different structures. In this way, the reliability of the optical signals received by the photoelectric sensor assemblies 104 is not affected, and thus the accuracy of determining the gaze position is ensured.

Figure 3:
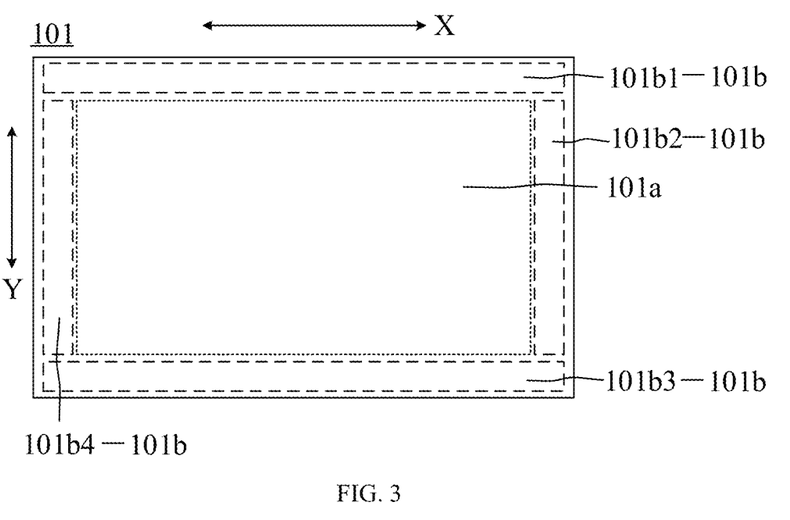
FIG. 3 is a top view of a display panel according to an embodiment of the present disclosure.

FIG. 3 is a top view of a display panel according to an embodiment of the present disclosure. As shown in FIG. 3, the display panel 101 may have a display region 101a and a peripheral region 101b surrounding the display region 101a. As shown in FIGS. 1 to 3, the plurality of photoelectric sensor assemblies 104 may be within the peripheral region 101b.

Because the plurality of photoelectric sensor assemblies 104 are disposed in the peripheral region 101b of the display panel 101, the plurality of photoelectric sensor assemblies 104 do not affect the normal display of the display panel 101, and the display panel 101 has a better display effect.

In the embodiments of the present disclosure, because different regions of the human eyes are different in reflectivity to light (e.g., infrared light), the optical signals received by the photoelectric sensor assemblies which are reflected via different regions of the human eye are different 104. The photoelectric sensor assemblies 104 has different signal values of electric signals converted from different optical signals, so the wearable display device can determine the gaze position of users' eyes on display panel 101 based on the signal values of electric signals.

In general, a data amount of the electric signals is small, and a data amount of the images is large. Therefore, the efficiency of the wearable display device in processing electric signals is higher than that in processing images. In the embodiments of the present disclosure, the wearable display device has a high processing efficiency for the electric signals transmitted via each of the photoelectric sensor assemblies 104, which can quickly determine the gaze position of the eyes of the user on display panel 101. In this way, the efficiency of the display panel 101 in displaying images is improved, and the refresh rate of the display panel 101 is higher.

To sum up, the embodiments of the present disclosure provide a wearable display device whose processing efficiency is higher for the electric signals transmitted via each of the photoelectric sensor assemblies, such that the wearable display device can more quickly determine the gaze position of the eyes of the user on the display panel based on the electric signals transmitted via each photoelectric sensor assembly. In this way, the efficiency of the display panel in displaying images is improved, and the refresh rate of the display panel is higher.

Moreover, the photoelectric sensor assemblies receive, via the target structure in the lens assembly, the optical signals reflected via the eyes of the user. Therefore, the optical signals received by each of the photoelectric sensor assemblies may be prevented from being transmitted via different structures, such that reliability of the optical signals received by the each of the photoelectric sensor assemblies is ensured, and hence accuracy of determining the gaze position is ensured.

In the embodiments of the present disclosure, the wearable display device 10 may also include a processing circuit (not shown in figures). The processing circuit may be connected to each of the photoelectric sensor assemblies 104. The position of each photoelectric sensor assemblies 104 may be pre-stored in the processing circuit. The processing circuit may be configured to determine the gaze position of the eyes of the user on the display panel 101 based on the signal values of the electric signals transmitted via each of the photoelectric sensor assemblies 104 and the position of at least one photoelectric sensor assembly 104.

Optionally, the light-emitting element 102 may be an infrared light-emitting diode. Because there is a large difference in reflectivity of the pupil, sclera, and iris of the eyes of the user to the infrared light, regarding the light-emitting element 102 as an infrared light-emitting diode may make the optical signals of infrared light received by the photoelectric sensor assemblies 104 which are reflected via pupil, sclera, and iris more different, facilitating the processing circuit of the wearable display device 10 to determine the gaze position of the eyes of the user on the display panel 101. Illustratively, the wavelength ranges of the light emitted by the light-emitting elements 102 may be 850 nm (nanometer) to 940 nm.

As shown in FIG. 3, the peripheral region 101*b* of the display panel 101 includes a first region (101*b*1 and 101*b*3) extending along a first direction X and a second region (101*b*2 and 101*b*4) extending along a second direction Y. The first direction X is intersected with the second direction Y.

Figure 4:
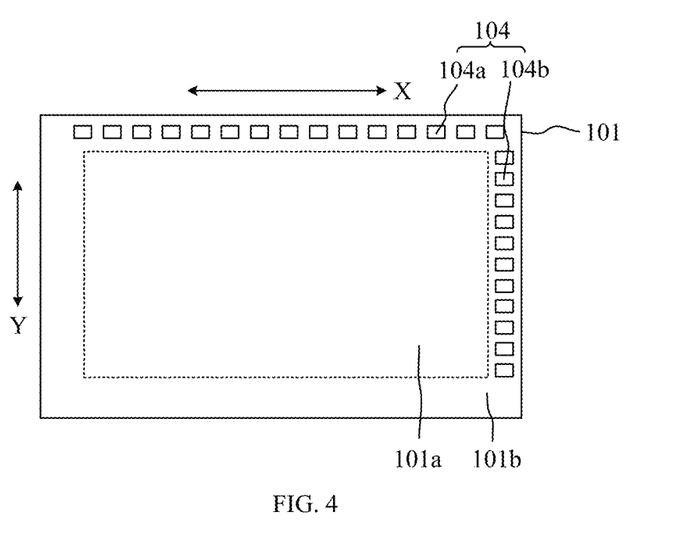
FIG. 4 is a schematic view of a display panel and a photoelectric sensor assembly according to an embodiment of the present disclosure.

As shown in FIGS. 3 to 4, the plurality of photoelectric sensor assemblies 104 may include a plurality of first photoelectric sensor assemblies 104*a* and a plurality of second photoelectric sensor assemblies 104*b*. The plurality of first photoelectric sensor assemblies 104*a* are arranged along the first direction X in the first region 101*b*1. The plurality of second photoelectric sensor assemblies 104*b* are arranged along the second direction Y in the second region 101*b*2.

Optionally, the plurality of first photoelectric sensor assemblies 104*a* are arranged evenly along the first direction X, and the plurality of second photoelectric sensor assemblies 104*b* are arranged evenly along the second direction Y.

In the embodiments of the present disclosure, the processing circuit included in the wearable display device 10 may receive electric signals transmitted via each of the plurality of first photoelectric sensor assemblies 104*a* and may determine at least one target first photoelectric sensor assembly from the plurality of first photoelectric sensor assemblies 104*a*. The processing circuit may also receive electric signals transmitted via each of the plurality of second photoelectric sensor assemblies 104*b* and may determine at least one target second photoelectric sensor assembly from the plurality of second photoelectric sensor assemblies 104*b*. Finally, the processing circuit may determine the gaze position of the eyes of the user on the display panel 101 based on the position of the at least one target first photoelectric sensor assembly and the position of the at least one target second photoelectric sensor assembly.

The signal value of the electric signal transmitted via the target first photoelectric sensor assembly may be less than or equal to the first threshold, and the signal value of the electric signal transmitted via the target second photoelectric sensor assembly may be less than or equal to the second threshold. The first threshold and the second threshold may be equal or not, which are not limited in the embodiments of the present disclosure.

The eye of user includes the pupil, sclera, and iris. Due to the deepest color of the pupil, the signal value of the optical signal reflected via the pupil is minimal. Further, the signal value of the electric signal converted from the optical signal reflected via the pupil is minimal. Thus, based on the signal value of the electric signal transmitted via the target first photoelectric sensor assembly which is less than or equal to the first threshold, and the signal value of the electric signal transmitted via the target second photoelectric sensor assembly that is less than or equal to the second threshold, the gaze position of the pupil of the eyes of the user on the display panel 101 may be determined. The signal value of the optical signal indicates the intensity of the light.

Optionally, the first threshold and the second threshold may be pre-stored fixed values in the processing circuit. Optionally, the first threshold may be determined by the processing circuit based on the received signal values of the electric signals of the plurality of first photoelectric sensor assemblies 104*a*; the second threshold may be determined by the processing circuit from the received signal values of the electric signals of the plurality of second photoelectric sensor assemblies 104*b*.

Illustratively, the processing circuit may sort the signal values of the N electric signals transmitted via the N first photoelectric sensor assemblies 104*a* in ascending order, and determine the signal value in the $n^{th}$ position as the first threshold. N is an integer greater than 1 and n is an integer greater than 1 and less than N/2. The processing circuit may sort the signal values of the M electric signals transmitted via the M second photoelectric sensor assemblies 104*b* in an ascending order, and determine the signal value in the $m^{th}$ position as the second threshold. M is an integer greater than 1 and n is an integer greater than 1 and less than M/2.

Optionally, the processing circuit determines the minimum of the signal value of the received electric signals of the plurality of first photoelectric sensor assemblies 104*a* as the first threshold, and the minimum of the signal value of the received electric signals of the plurality of second photoelectric sensor assemblies 104*b* as the second threshold.

In the embodiments of the present disclosure, the processing circuit may determine the position of the target first photoelectric sensor assembly with the minimal signal value of the electric signal transmitted via the plurality of first photoelectric sensor assemblies 104*a*, and may determine the position of the target second photoelectric sensor assembly with the minimal signal value of the electric signal transmitted via the plurality of second photoelectric sensor assemblies 104*b*. The processing circuit may determine the gaze position of the eyes of the user on the display panel 101 based on the position of the target first photoelectric sensor assembly and the position of the target second photoelectric sensor assembly.

As shown in FIG. 3, the first direction X is perpendicular to the second direction Y. The first direction X may be the pixel row direction of the display panel 101, and the second direction Y may be the pixel column direction of the display panel 101.

As shown in FIG. 3, the peripheral region 101*b* may include two first regions (101*b*1 and 101*b*3) and two second regions (101*b*2 and 101*b*4). The two first regions (101*b*1 and 101*b*3) may be arranged along the second direction Y and respectively disposed on either side of the display region 101*a*. The two second regions (101*b*2 and 101*b*4) may be arranged along the first direction X and respectively disposed on either side of the display region 101*a*.

Figure 5:
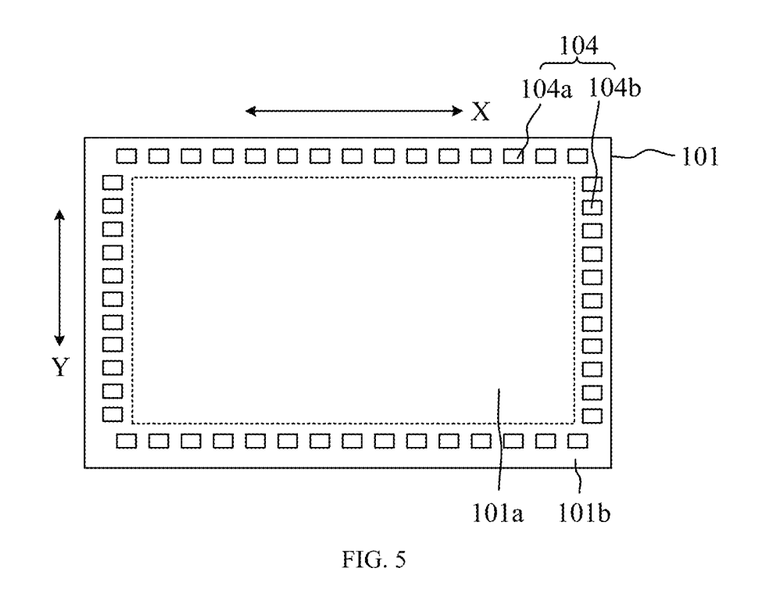
FIG. 5 is a schematic view of another display panel and a photoelectric sensor assembly according to an embodiment of the present disclosure.

As shown in FIG. 5, in the plurality of first photoelectric sensor assemblies 104*a* of the plurality of the photoelectric sensor assemblies 104, one portion of the first photoelectric sensor assemblies 104*a* is disposed in one of the first regions 101*b*1, and the other portion of the first photoelectric sensor assemblies 104*a* is disposed in the other of the first regions 101*b*3. In the plurality of second photoelectric sensor assemblies 104*b* of the plurality of the photoelectric sensor assemblies 104, one portion of the second photoelectric sensor assemblies 104*b* is disposed in one of the second regions 101b2, and the other portion of the second photoelectric sensor assemblies 104a is disposed in the other of the second regions 101b4.

Thus, the processing circuit may determine the gaze position of the eyes of the user on the display panel 101 based on the first photoelectric sensor assemblies 104a in the two first regions (101b1 and 101b3) and the second photoelectric sensor assemblies 104b in the two second regions (101b2 and 101b4), improving the accuracy of determining the gaze position.

Figure 6:
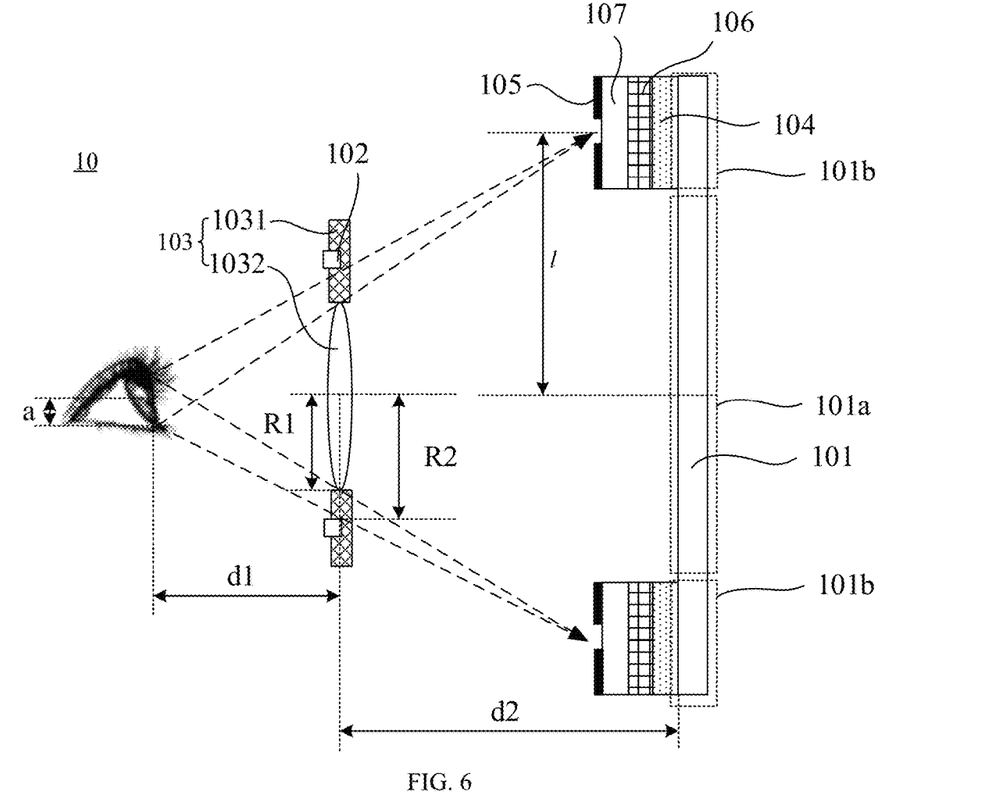
FIG. 6 is a schematic structural view of another wearable display device according to an embodiment of the present disclosure.
Figure 7:
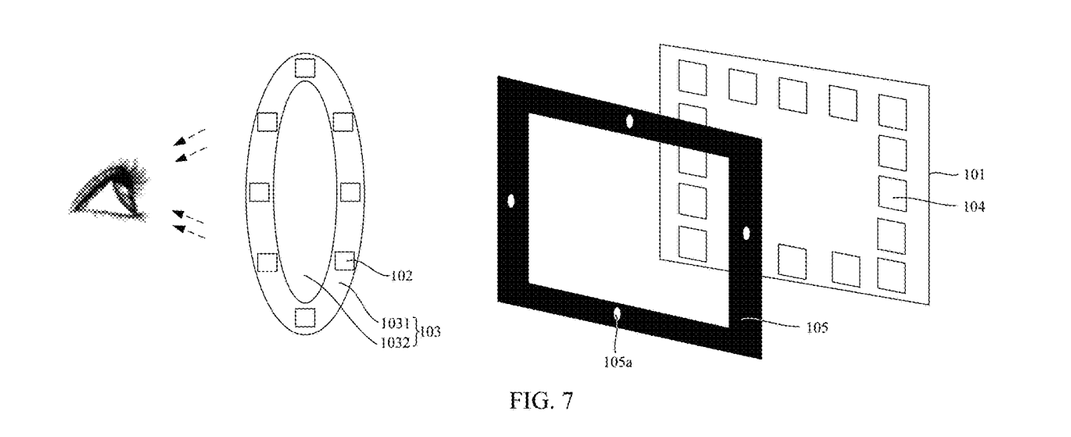
FIG. 7 is a schematic structural view of another wearable display device according to an embodiment of the present disclosure.

FIG. 6 is a schematic structural view of another wearable display device according to an embodiment of the present disclosure. As shown in FIG. 6, the wearable display device 10 may also include an optical structure 105. The optical structure 105 may be disposed between the photoelectric sensor assemblies 104 and the lens assembly 103. As shown in FIG. 7, the optical structure 105 may be of an annular structure, and the orthographic projection of the optical structure 105 on the display panel 101 is within the peripheral region 101b.

Optionally, the optical structure 105 may include a light shielding region and a plurality of light transmissive regions. Each of the light transmissive regions may be configured to transmit the optical signals to at least one of the photoelectric sensor assemblies 104. That is, light reflected via the eyes of the user may be irradiated from the light transmissive regions to the photoelectric sensor assemblies 104.

The material of the light shielding region of the optical structure 105 may be an opaque material. The optical structure 105 may be provided with through holes 105a, and the light transmissive region may be composed of the through holes on the optical structure 105. Four through holes 105a are show in FIG. 7. The four through holes 105a are respectively disposed in the middle of one side of the optical structure 105.

Optionally, there may be other number of through holes on the optical structure 105. Optionally, the optical structure 105 may have a greater number of through holes on the optical structure 105, which may form an array of holes, and the light transmissive region may include the array of holes. Illustratively, the number of through holes on the optical structure 105 may be the same as, and one-to-one with, the number of photoelectric sensor assemblies 104 included on the wearable display device.

Optionally, the optical structure 105 may have a slit, and the light transmissive region may include the slit on the optical structure 105. Optionally, the optical structure 105 may have a plurality of slits o that can form an array of slits, and the light transmissive region may include the array of slits. Optionally, the light transmissive region of the optical structure 105 may include a light transmitting structure such as a lens 1032 or a lenticular lens.

In some embodiments, as shown in FIG. 6, the target structure is a lens mount 1031. The target region of the lens mount 1031 may be configured to transmit infrared light and absorb visible light. The target region includes zones configured to transmit the optical signals of the light-emitting elements 102 reflected via the eyes of the user.

Optionally, the material of the target region of the lens mount 1031 includes at least one of acrylonitrile butadiene styrene copolymers (ABS), polycarbonate (PC), and polymethyl methacrylate (PMMA).

The ABS material is a black and high brightness material, and has a specific gravity of 1.08 and a transmittance of the near infrared light up to 90%. Further, the ABS material has a refractive index of 1.56, a good temperature resistance up to 90 degrees, a good fluidity, and a high mechanical strength. The lens mount 1031 may be made of the ABS material. The PC material is a black high brightness material, achieves a strong absorption effect of visible light, and has a transmittance of the near infrared light up to 93%. Further, the PC material has a good temperature resistance, such that the PC material may not deform even when the temperature reaches 120 degrees, an aging resistance, a high mechanical strength with a shock and broken resistance, which may be used to form the lens mount 1031. The PMMA material is a black material and has a good smoothness, and has an absorption rate regarding visible light up to 99.9% and a transmittance regarding near infrared light up to 95%. The lens mount 1031 may be made of the PMAA material.

Because the light-emitting elements 102 are infrared light-emitting diodes, the light emitted from the light-emitting elements 102 is infrared light. In one aspect, because the target region of the lens mount 1031 is capable of transmitting infrared light, the light emitted by the light-emitting elements 102 may be transmitted via the target region of the lens mount 1031 to the photoelectric sensor assemblies 104 after being reflected via the eyes of the user. In another aspect, because the target region of the lens mount 1031 is capable of absorbing visible light, the user fails to observe the photoelectric sensor assemblies 104 within the peripheral region 101b of the display panel 101 when wearing the wearable display device 10, making the user experience better.

In the embodiments of the present disclosure, that the photoelectric sensor assemblies 104 receives the optical signals, reflected via the eyes of the user, of the light-emitting elements 102 transmitted via the lens mount 1031 may mean that: the photoelectric sensor assemblies 104 receive optical signals, reflected via the entire region of the eyes of the user, of the light-emitting elements 102 transmitted via the lens mount 1031, instead of receiving optical signals, reflected via either area of the eyes of the user, of the light-emitting elements 102 transmitted via the lens 1032.

Optionally, in the case that the light reflected via a first target region of the eyes of the user is transmitted via the lens mount 1031 to the photoelectric sensor assemblies 104 disposed in a second target region in the peripheral region 101b of the display panel 101, all of the light reflected via the entire region of the eyes of the user may be transmitted via the lens mount 1031 to the photoelectric sensor assemblies 104 disposed in the second target region.

The orthographic projection of the first target region of the eyes of the user on the display panel 101 is distal from the orthographic projection of the photoelectric sensor assemblies 104 in the second target region on the display panel 101 relative to the orthographic projection of the other regions of the eyes of the user on the display panel 101.

Illustratively, the first target region of the eyes of the user may be a lowest region of the eyes of the user. The photoelectric sensor assemblies 104 in the second target region may be the photoelectric sensor assemblies 104 disposed in an upper region 101b1 of the first regions of the peripheral region 101b. That is, in the case that the light reflected via the lowest region of the eyes of the user is transmitted via the lens mount 1031 to the photoelectric sensor assemblies 104 disposed in the upper region 101b1 of the peripheral region 101b, all of the light reflected via the entire region of the eyes of the user may be transmitted via the lens mount 1031 to the photoelectric sensor assemblies 104 disposed in the upper region 101b1 of the peripheral region 101b.

Optionally, the first target region of the eyes of the user may be an uppermost region the eyes of the user. The photoelectric sensor assemblies 104 of the second target region may be the photoelectric sensor assemblies 104 disposed in a lower region 101b3 of the first regions of the peripheral region 101b. That is, in the case that the light reflected via uppermost region of the eyes of the user is transmitted via the lens mount 1031 to the photoelectric sensor assemblies 104 disposed in the lower region 101b3 of the peripheral region 101b, all of the light reflected via the entire region of the eyes of the user may be transmitted via the lens mount 1031 to the photoelectric sensor assemblies 104 disposed in the lower region 101b3 of the peripheral region 101b.

Optionally, the first target region of the eyes of the user may be a leftmost region the eyes of the user. The photoelectric sensor assemblies 104 of the second target region may be the photoelectric sensor assemblies 104 disposed in a right region 101b2 of the second regions the peripheral region 101b. That is, in the case that the light reflected via leftmost region of the eyes of the user is transmitted via the lens mount 1031 to the photoelectric sensor assemblies 104 disposed in the right region 101b2 of the peripheral region 101b, all of the light reflected via the entire region of the eyes of the user may be transmitted via the lens mount 1031 to the photoelectric sensor assemblies 104 disposed in the right region 101b2 of the peripheral region 101b.

Optionally, the first target region of the eyes of the user may be a rightmost region the eyes of the user. The photoelectric sensor assemblies 104 of the second target region may be the photoelectric sensor assemblies 104 disposed in a left region 101b4 of the second regions of the peripheral region 101b. That is, in the case that the light reflected via rightmost region of the eyes of the user is transmitted via the lens mount 1031 to the photoelectric sensor assemblies 104 disposed in the left region 101b4 of the peripheral region 101b, all of the light reflected via the entire region of the eyes of the user may be transmitted via the lens mount 1031 to the photoelectric sensor assemblies 104 disposed in the left region 101b4 of the peripheral region 101b.

In embodiments of the present application, the lens 1032 may be in a circular shape. In order that the light reflected via the first target region of the eyes of the user is transmitted via the lens mount 1031 to the photoelectric sensor assemblies 104 disposed in the second target region, a distance l between a center of each of the light transmissive region of the optical structure 105 and a center of the display region 101a of the display panel 101 satisfies:

$$l \geq \frac{(d1+d2)(R1+a)}{d1} - a \qquad \text{Formula (1)}$$

The light transmissive region of the optical structure 105 is configured to transmit optical signals to the photoelectric sensor assemblies 104 disposed in the second target region. The distance l between the center of the light transmissive region of the optical structure 105 and the center of the display region 101a of the display panel 101 may refer to the distance between the center of the light transmissive region of the optical structure 105 and the center of the display region 101a of the display panel 101 along a target direction. The target direction may be perpendicular to the extension direction of the second target region.

Illustratively, the target direction may be the second direction Y, and the extension direction of the second target region may be the first direction X. Alternatively, the target direction may be the first direction X, and the extension direction of the second target region may be the second direction Y.

In Formula (1), d1 represents a distance between the eyes of the user and the lens, d2 represents a distance between the lens and the display panel, R1 represents a radius of the lens, and the a represents a maximum radius of movement of the pupils. The distance d1 between the eyes of the user and the lens 1032 may be the approximate distance between the eyes of the user and the lens 1032 when the user is wearing the wearable display device. In addition, because different people have different size of the eyes, and the maximum radius of movement of the pupil is also different. Therefore, the maximum radius of movement of the pupils may be an empirical value, for example, 8 mm.

Assuming that d1 is 30 mm, d2 is 30 mm, a is 8 mm, and R1 is 20 mm, then l≥48 mm may be derived according to Formula (1). That is, in the case that the distance l between the center of the light transmissive region of the optical structure 105 and the center of the display region 101a of the display panel 101 is greater than or equal to 48 mm, it is possible to ensure that light reflected via either region of the eyes of the user is transmitted via the lens mount 1031 to the photoelectric sensor assemblies 104 disposed in the second target region.

In the embodiments of the present disclosure, Formula (1) may be derived by Formula (2):

$$\frac{l+a}{d1+d2} \geq \frac{R1+a}{d1} \qquad \text{Formula (2)}$$

Formula (2) may be obtained according to the triangle similarity theorem.

In the embodiments of the present disclosure, as shown in FIG. 6, each of the plurality of light-emitting elements 102 may be fixedly connected to one side, distal from the display panel 101, of the lens mount 1031, and the plurality of light-emitting elements 102 are arranged evenly. In this case, in order to avoid the optical signals reflected via the eyes of the user from being obscured by the light-emitting elements 102 fixed on the lens mount 1031, the distance R2 between one side, proximal to the lens 1032, of each of the plurality of light-emitting elements 102 and the center of the lens 1032 satisfies:

$$R2 \geq \frac{(l-a)d1}{d1+d2} + a \qquad \text{Formula (3)}$$

The meaning of the various symbols in Formula (3) may be found in the detailed description of the symbols in Formula (1), which is not repeated herein.

The distance R2 between one side, proximal to the lens 1032, of each of the plurality of light-emitting elements 102 and the center of the lens 1032 may refer to the distance between one side, proximal to the lens 1032, of the light-emitting elements 102 and the center of the display region 101a of the display panel 101 along a target direction. The target direction may be perpendicular to the extension direction of the second target region.

Illustratively, the target direction may be the second direction Y, and the extension direction of the second target region may be the first direction X. Or, the target direction is the first direction X, and the extension direction of the second target region may be the second direction Y.

Assuming that d1 is 30 mm, d2 is 30 mm, a is 8 mm, R1 is 20 mm, and l is 48 mm, then R2≥28 mm may be derived according to Formula (3). That is, in the case that the distance R2 between one side, proximal to the lens 1032, of each of the plurality of light-emitting elements 102 and the center of the lens 1032 is greater than or equal to 28 mm, the light-emitting elements 102 fixed on the lens mount 1031 may be prevented from obscuring the optical signals reflected via the eyes of the user.

In the embodiments of the present disclosure, Formula (3) may be derived by Formula (4):

$$\frac{R2-a}{d1} \geq \frac{l-a}{d1+d2} \quad \text{Formula (4)}$$

Formula (4) may be obtained according to the triangle similarity theorem.

In the embodiments of the present disclosure, assuming that the light-emitting elements 102 are not fixed to one side, distal from the display panel 101, of the lens mount 1031, but is integrated in the display panel 101, then in the case of lens mount 1031 as the target structure, the distance R2 between one side, proximal to the lens 1032, of each of the plurality of light-emitting elements 102 and the center of the lens 1032 may not be required to satisfy Formula (3) when the target structure is the lens mount 1031, as long as the light emitted by the light-emitting element 102 can reach the eyes of the user.

Figure 8:
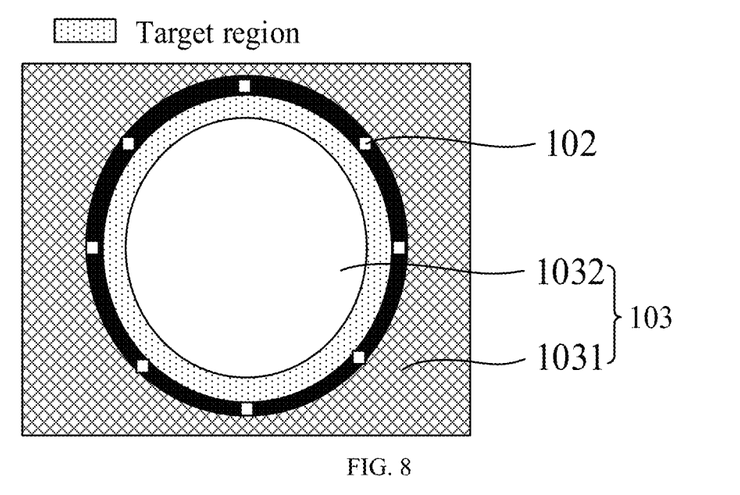
FIG. 8 is a schematic structural view of a lens assembly according to an embodiment of the present disclosure.
Figure 9:
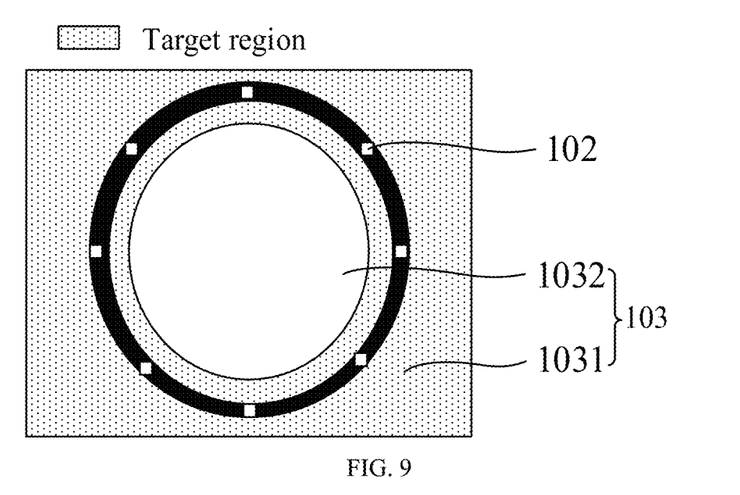
FIG. 9 is a schematic structural view of another lens assembly according to an embodiment of the present disclosure.

Optionally, as shown in FIG. 8, the light-emitting elements 102 are fixedly connected to one side, distal from the display panel 101, of the lens mount 1031, and the target region of the lens mount 1031 may be disposed between the light-emitting elements 102 and the lens 1032. Optionally, as shown in FIG. 9, the light-emitting elements 102 are fixedly connected to one side, distal from the display panel 101, of the lens mount 1031, and the target region of the lens mount 1031 may be the entire region of the lens mount 1031. Optionally, as shown in FIG. 9, the light-emitting elements 102 are not fixedly connected to one side, distal from the display panel 101, of the lens mount 1031, and the target region of the lens mount 1031 may also be the entire region of the lens mount 1031.

In this embodiment, by making the target region of the lens mount 1031 transmit infrared light, and the photoelectric sensor assemblies 104 receive optical signals of the light-emitting elements 102 reflected via the eyes of the user transmitted via the lens mount 1031, and thus the photoelectric sensor assemblies 104 receives the optical signals, reflected via the eyes of the user transmitted via one structure. Thus, the optical signals received by the photoelectric sensor assemblies 104 are prevented from being transmitted via different structures. In this way, the reliability of the optical signals received by the photoelectric sensor assemblies 104 is not affected, and thus the accuracy of determining the gaze position is ensured.

Figure 10:
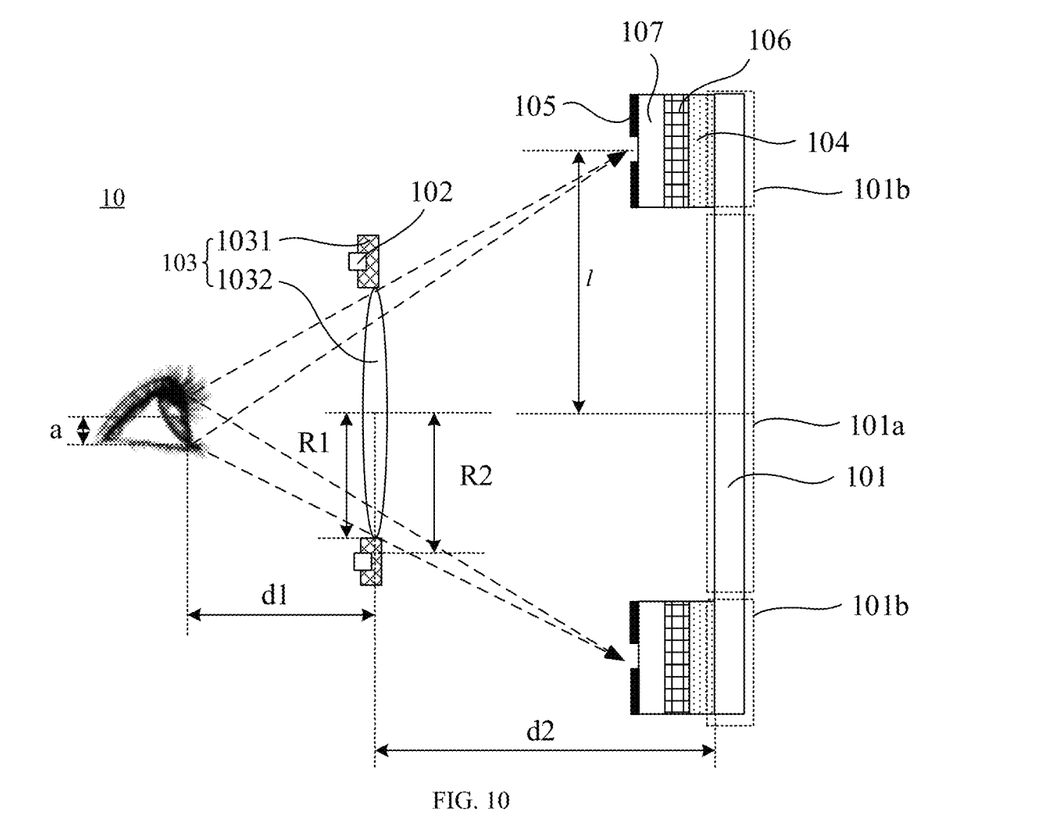
FIG. 10 is a schematic structural view of another wearable display device according to an embodiment of the present disclosure.

In some embodiments, as shown in FIG. 10, the target structure is a lens 1032. The lens 1032 may be configured to transmit infrared light and visible light.

Because the light-emitting elements 102 are infrared light-emitting diodes, the light emitted from the light-emitting elements 102 is infrared light. In one aspect, because the lens 1032 is capable of transmitting infrared light, the light emitted by the light-emitting elements 102 may be transmitted via the lens 1032 to the photoelectric sensor assemblies 104 after being reflected via the eyes of the user. In another aspect, because the lens 1032 is capable of transmitting visible light, the user may see the image displayed in the display panel 101 via the lens 1032 when wearing the wearable display device 10.

In the embodiments of the present disclosure, that the photoelectric sensor assemblies 104 receives the optical signals of the light-emitting elements 102 reflected via the eyes of the user transmitted via the lens 1032 may mean that: the photoelectric sensor assemblies 104 receive optical signals, reflected via the entire region of the eyes, of the light-emitting elements 102 of the user transmitted via the lens 1032, instead of receiving optical signals, reflected via either area of the eyes of the user, of the light-emitting elements 102 transmitted via the lens mount 1031.

Optionally, in the case that the light reflected via a target region of the eyes of the user is transmitted via the lens 1032 to the photoelectric sensor assemblies 104 disposed in a fourth target region in the peripheral region 101b of the display panel 101, all of the light reflected via the entire region of the eyes of the user may be transmitted via the lens 1032 to the photoelectric sensor assemblies 104 disposed in the fourth target region.

An orthographic projection of the third target region of the eyes of the user on the display panel 101, relative to an orthographic projection of the other regions of the eyes of the user on the display panel 101, is near the orthographic projection of the photoelectric sensor assemblies 104 in the fourth target region on the display panel 101.

Illustratively, the third target region of the eyes of the user may be the lowest region of the eyes of the user. The photoelectric sensor assemblies 104 of the fourth target region may be the photoelectric sensor assemblies 104 disposed in the lower region 101b3 of the peripheral region 101b. That is, in the case that the light reflected via the lowest region of the eyes of the user is transmitted via the lens 1032 to the photoelectric sensor assemblies 104 disposed in the lower region 101b3 of the peripheral region 101b, all of the light reflected via the entire region of the eyes of the user may be transmitted via the lens 1032 to the photoelectric sensor assemblies 104 disposed in the lower region 101b3 of the peripheral region 101b.

Optionally, the third target region of the eyes of the user may be the uppermost region the eyes of the user. The photoelectric sensor assemblies 104 in the fourth target region may be the photoelectric sensor assemblies 104 disposed in the upper region 101b1 of the peripheral region 101b. That is, in the case that the light reflected via uppermost region of the eyes of the user is transmitted via the lens 1032 to the photoelectric sensor assemblies 104 disposed in the upper region 101b1 of the peripheral region 101b, all of the light reflected via the entire region of the eyes of the user may be transmitted via the lens 1032 to the photoelectric sensor assemblies 104 disposed in the upper region 101b1 of the peripheral region 101b.

Optionally, the third target region of the eyes of the user may be the rightmost region the eyes of the user. The photoelectric sensor assemblies 104 in the second target region may be the photoelectric sensor assemblies 104 disposed in the right region 101b2 of the peripheral region 101b. That is, in the case that the light reflected via the rightmost region of the eyes of the user is transmitted via the lens 1032 to the photoelectric sensor assemblies 104 disposed in the right region 101b2 of the peripheral region 101b, all of the light reflected via the entire region of the eyes of the user may be transmitted via the lens 1032 to the photoelectric sensor assemblies 104 disposed in the right region 101*b*2 of the peripheral region 101*b*.

Optionally, the third target region of the eyes of the user may be the leftmost region the eyes of the user. The photoelectric sensor assemblies 104 in the second target region may be the photoelectric sensor assemblies 104 disposed in the left region 101*b*4 of the peripheral region 101*b*. That is, in the case that the light reflected via the leftmost region of the eyes of the user is transmitted via the lens 1032 to the photoelectric sensor assemblies 104 disposed in the left region 101*b*4 of the peripheral region 101*b*, all of the light reflected via the entire region of the eyes of the user may be transmitted via the lens 1032 to the photoelectric sensor assemblies 104 disposed in the left region 101*b*4 of the peripheral region 101*b*

In embodiments of the present application, the lens 1032 may be in a circular shape. In order that the light reflected via the third target region of the eyes of the user is transmitted via the lens 1032 to the photoelectric sensor assemblies 104 disposed in the fourth target region, the radius R2 of the lens 1032 satisfies:

$$R2 \geq \frac{(l-a)d1}{d1+d2} + a \qquad \text{Formula (5)}$$

In Formula (5), l represents a distance between a center of the light transmissive region and a center of the display region of the display panel, d1 represents a distance between the eyes of the user and the lens along a direction perpendicular to the display panel, d2 represents a distance between the lens and the display panel along the direction perpendicular to the display panel, and a represents a maximum radius of movement of the pupils.

The distance d1 between the eyes of the user and the lens 1032 may be the approximate distance between the eyes of the user and the lens 1032 when the user is wearing the wearable display device. In addition, because different people have different size of the eyes, and the maximum radius of movement of the pupils is also different. So, the maximum radius of movement of the pupils may be an empirical value, for example, 8 mm.

In addition, the light transmissive region of the optical structure 105 is used to transmit optical signals to the photoelectric sensor assemblies 104 disposed in the fourth target region. The distance l between the center of the light transmissive region of the optical structure 105 and the center of the display region 101*a* of the display panel 101 may refer to the distance between the center of the light transmissive region of the optical structure 105 and the center of the display region 101*a* of the display panel 101 along a target direction. The target direction may be perpendicular to the extension direction of the fourth target region.

Illustratively, the target direction may be the second direction Y, and the extension direction of the fourth target region may be the first direction X. Optionally, the target direction may be the first direction X, and the extension direction of the fourth target region may be the second direction Y.

In the embodiments of the present disclosure, Formula (5) may be derived by Formula (6):

$$\frac{R2-a}{d1} \geq \frac{l-a}{d1+d2} \qquad \text{Formula (6)}$$

Formula (6) may be obtained according to the triangle similarity theorem.

In this embodiment, by increasing the radius of the lens 1032, and making the photoelectric sensor assemblies 104 receive optical signals, reflected via the eyes of the user, of the light-emitting elements 102 transmitted via the lens 1032, and thus the photoelectric sensor assemblies 104 receives the optical signals, reflected via the eyes of the user transmitted via one structure. Thus, the optical signals received by the photoelectric sensor assemblies 104 are prevented from being transmitted via different structures. In this way, the reliability of the optical signals received by the photoelectric sensor assemblies 104 is not affected, and thus the accuracy of determining the gaze position is ensured.

In the embodiments of the present disclosure, as shown in FIGS. 6 and 10, the wearable display device 10 may further include a filter 106. The filter 106 may be disposed on a side, distal from the display panel 101, of the plurality of photoelectric sensor assemblies 104, and the orthographic projection of the filter 106 on the display panel 101 covers the orthographic projection of the plurality of photoelectric sensor assemblies 104 on the display panel 101. The filter may be configured to absorb infrared light and visible light.

By disposing the filter 106 on a side, distal from the display panel 101, of the photo assemblies 104 to filter out visible light, it is possible to prevent the optical signals received by each of the photoelectric sensor assemblies 104 from being affecting by the light emitted by the display panel 101, thereby ensuring the accuracy of the determined gaze position.

As shown in FIGS. 6 and 10, the wearable display device 10 may further include a light transmitting layer 107. The light transmitting layer 107 is disposed on a side, distal from the display panel 101, of the plurality of photoelectric sensor assemblies 104. In FIGS. 6 and 10, the orthographic projection of the light transmitting layer 107 on the display panel 101 covers the orthographic projection of the plurality of photoelectric sensor assemblies 104 on the display panel 101.

Figure 11:
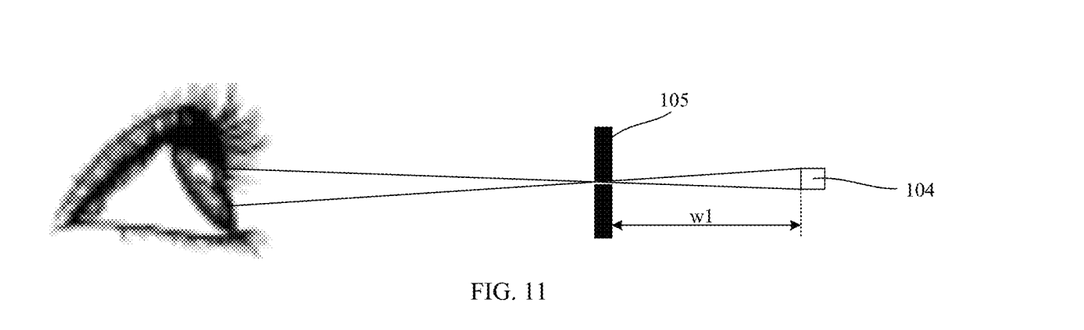
FIG. 11 is a schematic view of an optical structure and a photoelectric sensor assembly according to an embodiment of the present disclosure.
Figure 12:
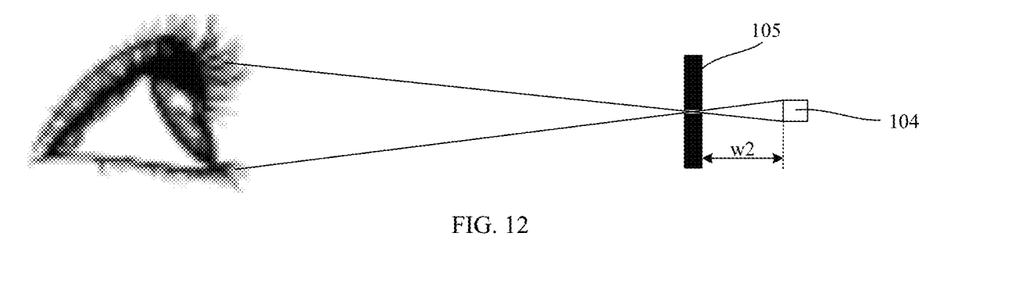
FIG. 12 is a schematic view of another optical structure and a photoelectric sensor assembly according to an embodiment of the present disclosure.

FIG. 11 is a schematic view of an optical structure and a photoelectric sensor assembly according to an embodiment of the present disclosure. FIG. 12 is a schematic view of another optical structure and a photoelectric sensor assembly according to an embodiment of the present disclosure. The wearable display device 10 shown in FIG. 11 includes a light transmitting layer 107. The wearable display device 10 shown in FIG. 12 does not include a light transmitting layer 107.

As shown in FIGS. 11 and 12, the distance w1 between the optical structure 105 and the photoelectric sensor assemblies 104 in the solution with a light transmitting layer 107 is disposed is greater than the distance w2 between the optical structure 105 and the photoelectric sensor assemblies 104 in the solution without a light transmitting layer 107. That is, the wearable display device 10 provided with a light transmitting layer 107 can reduce the region of the eyes of the user corresponding to the optical signals received by each photoelectric sensor assemblies 104, which improves the accuracy of the optical signal received by the photoelectric sensor assemblies 104, and thus increasing the accuracy of the determined gaze position.

To sum up, the embodiments of the present disclosure provide a wearable display device whose processing efficiency is higher for the electric signals transmitted via each of the photoelectric sensor assemblies, such that the wearable display device can more quickly determine the gaze position of the eyes of the user on the display panel based on the electric signals transmitted via each of the photoelectric sensor assemblies. In this way, the efficiency of the display panel in displaying images is improved, and the refresh rate of the display panel is higher.

Moreover, because the photoelectric sensor assemblies receive the optical signals, reflected via the eyes of the user transmitted via the target structure in the lens assembly, the optical signals received by the photoelectric sensor assemblies are prevented from being transmitted via different structures. In this way, the reliability of the optical signals received by the photoelectric sensor assemblies is not affected, and thus the accuracy of determining the gaze position is ensured.

Described above are merely exemplary embodiments of the present application and are not intended to limit the present disclosure. Within the spirit and principles of the present application, any modifications, equivalent substitutions, improvements, and the like fall within the protection scope of the present disclosure.

What is claimed is:

1. A wearable display device, comprising:
   a display panel, comprising a display region and a peripheral region surrounding the display region;
   a plurality of light-emitting elements, configured to emit light to be irradiated to eyes of a user;
   a lens assembly, disposed on a light-exiting side of the display panel, the lens assembly comprising a lens mount and a lens within the lens mount, wherein a light transmittance of the lens mount is greater than a threshold, the lens mount is of an annular structure, and the lens is disposed within a region enclosed by the annular structure of the lens mount; and
   a plurality of photoelectric sensor assemblies in the peripheral region, each of the photoelectric sensor assemblies being configured to only receive an optical signal, reflected via the eyes of the user, of the light-emitting element transmitted via a target structure and convert the optical signal into an electric signal, the electric signal being configured to determine a gaze position of the eyes of the user on the display panel, the target structure being the lens or the lens mount.

2. The wearable display device according to claim 1, wherein the plurality of light-emitting elements are infrared light-emitting diodes.

3. The wearable display device according to claim 2, wherein the target structure is the lens mount;
   wherein a target region of the lens mount is configured to transmit infrared light and absorb visible light, the target region comprising a zone configured to transmit the optical signal of the light-emitting element reflected via the eyes of the user.

4. The wearable display device according to claim 3, further comprising an optical structure;
   wherein the optical structure is between the photoelectric sensor assemblies and the lens assembly, and an orthographic projection of the optical structure on the display panel is within the peripheral region; and the optical structure comprises a light shielding region and a plurality of light transmissive regions, each of the light transmissive regions being configured to transmit the optical signal to at least one of the photoelectric sensor assemblies.

5. The wearable display device according to claim 4, wherein the lens is in a circular shape; and a distance l between a center of each of the light transmissive regions and a center of the display region of the display panel satisfies:

$$l \geq \frac{(d1+d2)(R1+a)}{d1} - a;$$

wherein d1 represents a distance between the eyes of the user and the lens, d2 represents a distance between the lens and the display panel, R1 represents a radius of the lens, and a represents a maximum radius of movement of pupils.

6. The wearable display device according to claim 5, wherein the plurality of light-emitting elements is arranged evenly, and each of the light-emitting elements is fixedly connected to one side, distal from the display panel, of the lens mount; a distance R2 between one side, proximal to the lens, of each of the plurality of light-emitting elements and a center of the lens satisfies:

$$R2 \geq \frac{(l-a)d1}{d1+d2} + a.$$

7. The wearable display device according to claim 6, wherein the target region of the lens mount is between the light-emitting element and the lens; or
   the target region of the lens mount is an entire region of the lens mount.

8. The wearable display device according to claim 3, wherein a material of the target region of the lens mount comprises at least one of an acrylonitrile butadiene styrene copolymer, polycarbonate, and polymethyl methacrylate.

9. The wearable display device according to claim 2, wherein the target structure is the lens; and
   the lens is configured to transmit infrared light and visible light.

10. The wearable display device according to claim 9, further comprising an optical structure;
    wherein the optical structure is between the photoelectric sensor assemblies and the lens assembly, and an orthographic projection of the optical structure on the display panel is within the peripheral region; and the optical structure comprises a light shielding region and a plurality of light transmissive regions, each of the light transmissive regions being configured to transmit the optical signals to at least one of the photoelectric sensor assemblies.

11. The wearable display device according to claim 10, wherein the lens is in a circular shape; and a radius R2 of the lens satisfies:

$$R2 \geq \frac{(l-a)d1}{d1+d2} + a;$$

wherein l represents a distance between a center of the light transmissive region and a center of the display region of the display panel, d1 represents a distance between the eyes of the user and the lens along a direction perpendicular to the display panel, d2 represents a distance between the lens and the display panel along the direction perpendicular to the display panel, and a represents a maximum radius of movement of pupils.

12. The wearable display device according to claim 1, comprising a filter;
    wherein the filter is on a side, distal from the display panel, of the plurality of photoelectric sensor assemblies, and an orthographic projection of the filter on the display panel covers an orthographic projection of the plurality of photoelectric sensor assemblies on the display panel; and the filter is configured to transmit infrared light and absorb visible light.

13. The wearable display device according to claim 1, further comprising a light transmitting layer;
wherein the light transmitting layer is on a side, distal from the display panel, of the plurality of photoelectric sensor assemblies.

14. The wearable display device according to claim 1, wherein the peripheral region comprises a first region extending along a first direction and a second region extending along a second direction, the first direction being intersected with the second direction; and
the plurality of photoelectric sensor assemblies comprise a plurality of first photoelectric sensor assemblies and a plurality of second photoelectric sensor assemblies; the plurality of first photoelectric sensor assemblies being arranged along the first direction in the first region, and the plurality of second photoelectric sensor assemblies being arranged along the second direction in the second region.

15. The wearable display device according to claim 1, further comprising a processing circuit;
wherein the processing circuit is connected to each of the photoelectric sensor assemblies, and the processing circuit is configured to determine the gaze position of the eyes of the user on the display panel based on a size of a signal value of an electric signal transmitted via each of the photoelectric sensor assemblies and a position of at least one of the photoelectric sensor assemblies.

* * * * *

UNITED STATES PATENT AND TRADEMARK OFFICE
CERTIFICATE OF CORRECTION

PATENT NO. : 12,236,010 B2  
APPLICATION NO. : 17/776482  
DATED : February 25, 2025  
INVENTOR(S) : Yapeng Li et al.

Page 1 of 1

It is certified that error appears in the above-identified patent and that said Letters Patent is hereby corrected as shown below:

On the Title Page

Item (73) should read:  
Assignee: BOE Technology Group Co., Ltd., Beijing (CN)

Signed and Sealed this  
Twenty-fifth Day of March, 2025

Coke Morgan Stewart  
*Acting Director of the United States Patent and Trademark Office*